(12) United States Patent
Kruschwitz et al.

(10) Patent No.: US 6,750,998 B2
(45) Date of Patent: Jun. 15, 2004

(54) ELECTRO-MECHANICAL GRATING DEVICE HAVING A CONTINUOUSLY CONTROLLABLE DIFFRACTION EFFICIENCY

(75) Inventors: Brian E. Kruschwitz, Rochester, NY (US); John C. Brazas, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/957,334

(22) Filed: Sep. 20, 2001

(65) Prior Publication Data

US 2003/0058514 A1 Mar. 27, 2003

(51) Int. Cl.[7] .............................. G02B 26/02; H01J 3/14
(52) U.S. Cl. ...................... 359/230; 359/566; 359/573; 250/237 G; 250/237 R
(58) Field of Search ................................ 359/227, 230, 359/231, 223, 224, 558, 563, 566, 575, 569–573; 250/237 R, 237 G

(56) References Cited

U.S. PATENT DOCUMENTS

| 4,011,009 A | 3/1977 | Lama et al. |
|---|---|---|
| 4,492,435 A | 1/1985 | Banton et al. |
| 4,596,992 A | 6/1986 | Hornbeck |
| 5,115,344 A | 5/1992 | Jaskie |
| 5,311,360 A | 5/1994 | Bloom et al. |
| 5,459,610 A | 10/1995 | Bloom et al. |
| 5,661,593 A | 8/1997 | Engle |
| 5,677,783 A | 10/1997 | Bloom et al. |
| 5,757,536 A | 5/1998 | Ricco et al. |
| 6,479,811 B1 * | 11/2002 | Kruschwitz et al. ........ 359/573 |

* cited by examiner

*Primary Examiner*—James Phan
(74) *Attorney, Agent, or Firm*—Stephen H. Shaw

(57) ABSTRACT

An electro-mechanical grating device including: a base having a surface; a bottom conductive layer provided above said base; a spacer layer is provided and a longitudinal channel is formed in said spacer layer, wherein said spacer layer defines an upper surface and the channel having a first and a second opposing side wall and a bottom; a plurality of spaced apart ribbon elements disposed parallel to each other and spanning the channel, said ribbon elements are fixed to the upper surface of the spacer layer on each side of the channel and each of the ribbon elements is provided with a conductive layer; a mechanical stop provided between the bottom conductive layer and the bottom of the channel wherein the mechanical stop forms a rigid barrier that is separated from a lower ribbon surface of the ribbon elements by a distance $h_0$.

25 Claims, 13 Drawing Sheets

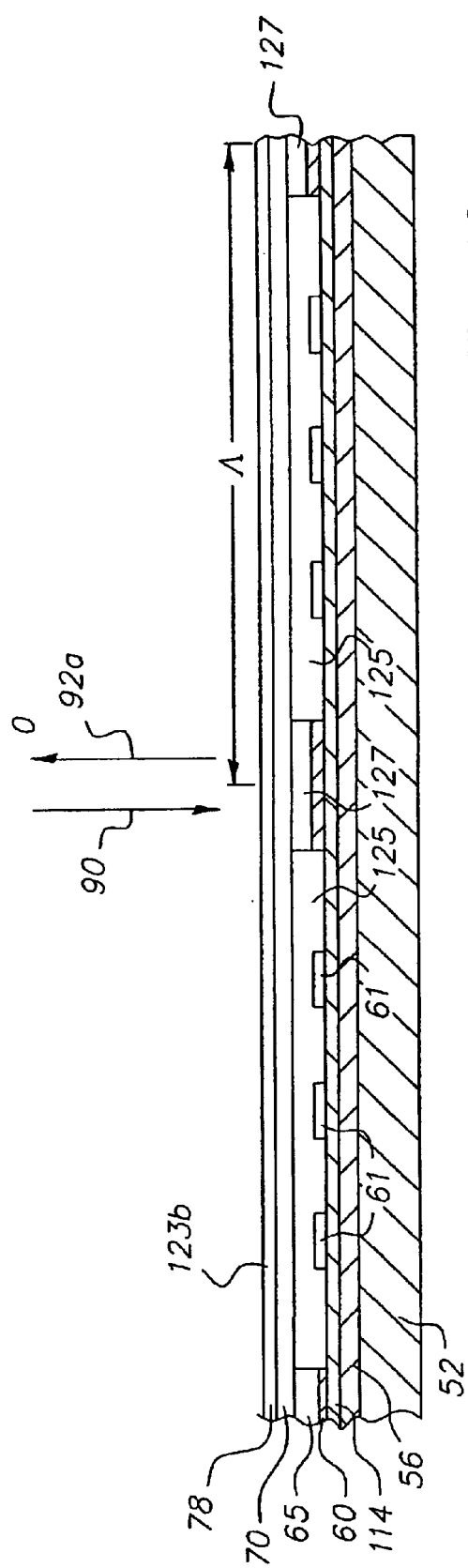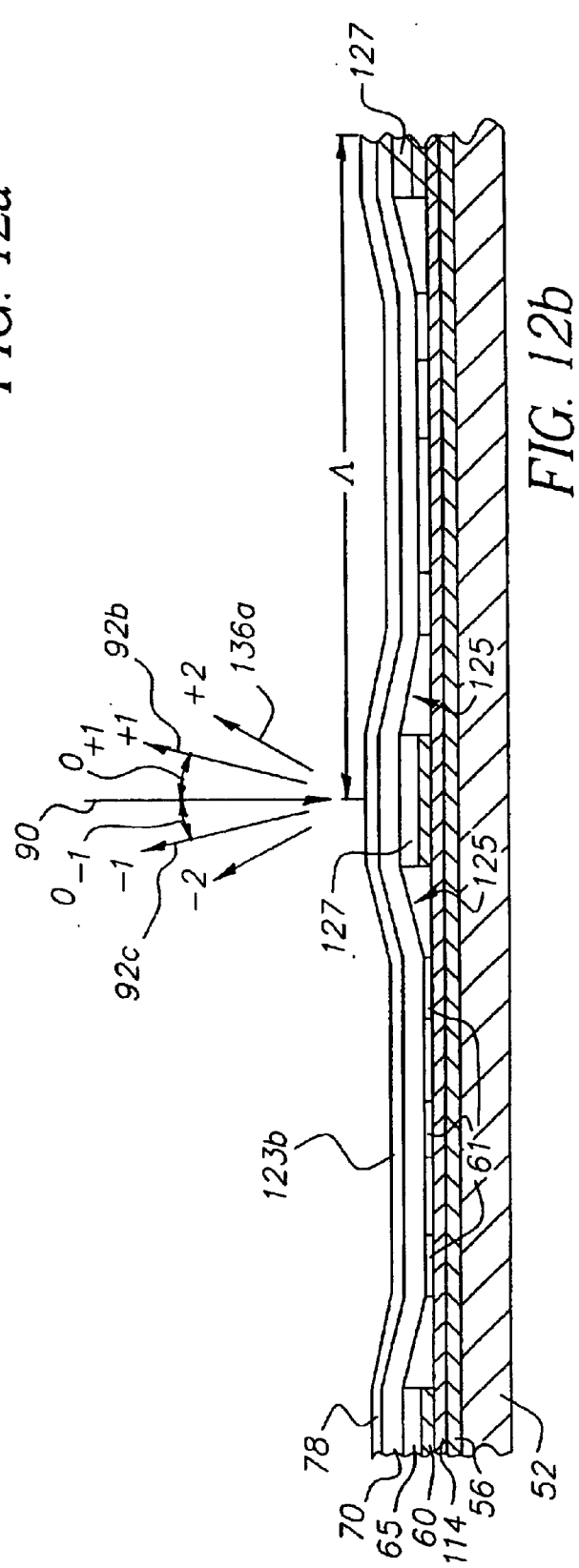

US 6,750,998 B2

ELECTRO-MECHANICAL GRATING DEVICE HAVING A CONTINUOUSLY CONTROLLABLE DIFFRACTION EFFICIENCY

FIELD OF THE INVENTION

The invention relates to an electro-mechanical grating device, and more specifically, to an electro-mechanical grating device having a continuously controllable diffraction efficiency.

BACKGROUND OF THE INVENTION

Electro-mechanical spatial light modulators have been designed for a variety of applications, including image processing, display, optical computing, and printing. Optical beam processing for printing with deformable mirrors is well known as is a device for optical beam modulation using cantilever mechanical beams. Other applications of electro-mechanical spatial light modulators include wavelength division multiplexing and spectrometers.

Electro-mechanical gratings are also well documented in the patent literature; see U.S. Pat. No. 4,011,009, issued Mar. 8, 1977 to Lama et al., entitled "Reflection Diffraction Grating Having a Controllable Blaze Angle," and U.S. Pat. No. 5,115,344, issued May 19, 1992 to J. E. Jaskie, entitled "Tunable Diffraction Grating." More recently, Bloom et al. described an apparatus and method of fabrication for a device for optical beam modulation, known to one skilled in the art as a grating-light valve (GLV); see U.S. Pat. No. 5,311,360, issued May 10, 1994, entitled "Method and Apparatus for Modulating a Light Beam." This device was later described by Bloom et al. with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces; see U.S. Pat. No. 5,459,610, issued Oct. 17, 1995, entitled "Deformable Grating Apparatus for Modulating a Light Beam and Including Means for Obviating Stiction Between Grating Elements and Underlying Substrate."

In Bloom '610, a device is described in which the ribbons are deflected in a continuous range of heights above the substrate by varying the applied voltage. The space between the ribbons and the ground plane in this device must be relatively large in order to have continuous control of the diffraction efficiency allowable by the device. However, if the ribbons are actuated and thereby contact the surface of the substrate, either by error or due to charge accumulation in the dielectric ribbon material, the mechanical strain of the ribbon can exceed the ribbon material's critical strain and cause mechanical failure (i.e., breakage, cracking, or wear of the ribbons). Consequently, what is needed is an electro-mechanical grating device that can be driven to provide continuous control of the diffraction efficiency and that has less mechanical failure of the ribbon elements.

SUMMARY OF THE INVENTION

The aforementioned need is met by providing an electro-mechanical grating device including: a base having a surface; a bottom conductive layer provided above said base; a spacer layer is provided and a longitudinal channel is formed in the spacer layer, wherein the spacer layer defines an upper surface and the channel having a first and a second opposing side wall and a bottom; a plurality of spaced apart ribbon elements disposed parallel to each other and spanning the channel, the ribbon elements are fixed to the upper surface of the spacer layer on each side of the channel and each of the ribbon elements is provided with a conductive layer; a mechanical stop provided between the bottom conductive layer and the bottom of the channel wherein the mechanical stop forms a rigid barrier that is separated from a lower ribbon surface of the ribbon elements by a distance $h_0$, and that causes actual deflection distance of the ribbon elements to be limited to $h_0$ upon application of a pull-down voltage, thus reducing breakage of the ribbon elements, and wherein $d_{max} > h_0 > \lambda/4$, where $d_{max}$ is the ribbon deflection at which pull down occurs and $\lambda$ is a wavelength of light to be deflected by the electro-mechanical grating device.

Furthermore, the above need is accomplished by a second embodiment of the invention. The second embodiment is an electro-mechanical grating device, which includes: a base having a surface; a bottom conductive layer provided above said base; a spacer layer is provided and a longitudinal channel is formed in the spacer layer, the spacer layer defines an upper surface and the channel having a first and a second opposing side wall and a bottom; a plurality of spaced apart ribbon elements disposed parallel to each other and spanning the channel, said ribbon elements are fixed to the upper surface of the spacer layer on each side of the channel and each of the ribbon elements are provided with a conductive layer, the ribbon elements have a thickness $t_r$; a protective layer provided between the bottom conductive layer and the spacer layer, the protective layer has at least a thickness $t_s$, wherein $$t_s = \frac{1}{3}\left(\frac{t_r}{\varepsilon_r} + \frac{\lambda}{4}\right),$$

$\varepsilon_r$ is a dielectric constant of the ribbon elements, and $\lambda$ is a wavelength of light to be deflected by the electro-mechanical grating device; and a plurality of standoffs, patterned within the width of the channel, located atop the protective layer, and having a height equal to the thickness of the protective layer such that a mechanical stop is constructed.

Another embodiment is an electro-mechanical grating device, which includes: a bottom conductive layer provided above the base; a spacer layer is provided and a longitudinal channel is formed in the spacer layer, the spacer layer defines an upper surface and the channel having a first and a second opposing side wall and a bottom; a plurality of spaced apart ribbon elements disposed parallel to each other and spanning the channel, the ribbon elements are fixed to the upper surface of the spacer layer on each side of the channel and each ribbon element is provided with a conductive layer, the ribbon elements have a thickness $t_r$; a protective layer provided between the bottom conductive layer and the spacer layer, the protective layer has at least a thickness $t_s$ wherein $$t_s = \frac{1}{3}\left(\frac{t_r}{\varepsilon_r} + \frac{\lambda}{4}\right),$$

and the protective layer has a plurality of standoffs patterned within the width of the channel such that the standoffs have a height less than the thickness of the protective layer, while residing atop the protective layer to form a rigid barrier for the ribbon elements, once they are actuated.

ADVANTAGES

It is advantageous that the electro-mechanical grating device produces continuous control of the diffraction efficiency from the minimum to the maximum efficiencies. A mechanical stop consisting of at least one dielectric layer that forms a rigid mechanical barrier is provided to prevent over-actuation of the ribbon elements, thereby, eliminating the risk of ribbon element breakage, ribbon element cracking, or severe ribbon element wear. The rigid mechanical barrier consists of one or more layers of dielectric material, situated between the ground plane and the air gap, that is either continuous or patterned to form a stand-off structure fabricated on top of the ground plane.

BRIEF DESCRIPTION OF THE DRAWINGS

FIGS. 12a and 12b are cross-sectional views through line 12a,12b-12a, 12b in FIG. 11 showing the device in an unactuated state and an actuated state, respectively.

DETAILED DESCRIPTION OF THE INVENTION

In one embodiment, an electro-mechanical grating device with continuously controllable diffraction efficiency has a plurality of deformable ribbon elements suspended over one or more etched channels and modulates an optical beam by actuation of one or more sets of ribbon elements. The actuation is the control of the heights of the centers of the ribbon elements, relative to the channel walls, above the substrate, using an electrostatic force provided by applying a voltage to the ribbon elements with respect to an electrode (a bottom conductive layer) on the substrate. The periodic structure created by affecting the heights of the ribbon elements dictates the diffraction efficiency, with minimum and maximum diffraction efficiencies into the $1^{st}$ diffracted orders obtained with an actuation height difference of $\lambda/4$. To obtain a continuous actuation of the ribbon elements up to a height of $\lambda/4$, a gap that is much larger than the maximum desired deflection must be provided between the ribbon elements and the electrode on the substrate. One consequence of such a large gap is that a normal actuation of the ribbon elements deflecting to the substrate can cause mechanical failure. This invention includes the use of a dielectric layer to form a mechanical stop below the ribbon elements. The dielectric layer is continuous or patterned to form a standoff pattern, to maximize the dynamic range of the diffracted intensity while preventing the breakage of ribbon elements caused by mechanical failure.

Periodic corrugations on optical surfaces (i.e. diffraction gratings) are known to affect the directionality of incident light. Collimated light incident in air upon a grating surface is diffracted into orders, as described by the grating equation, $$\sin\theta_m = \sin\theta_0 + \frac{m\lambda}{\Lambda}, \qquad \text{Equation (1)}$$

where $\lambda$ is the wavelength of the light and m is an integer denoting the diffracted order.

Figure 1:
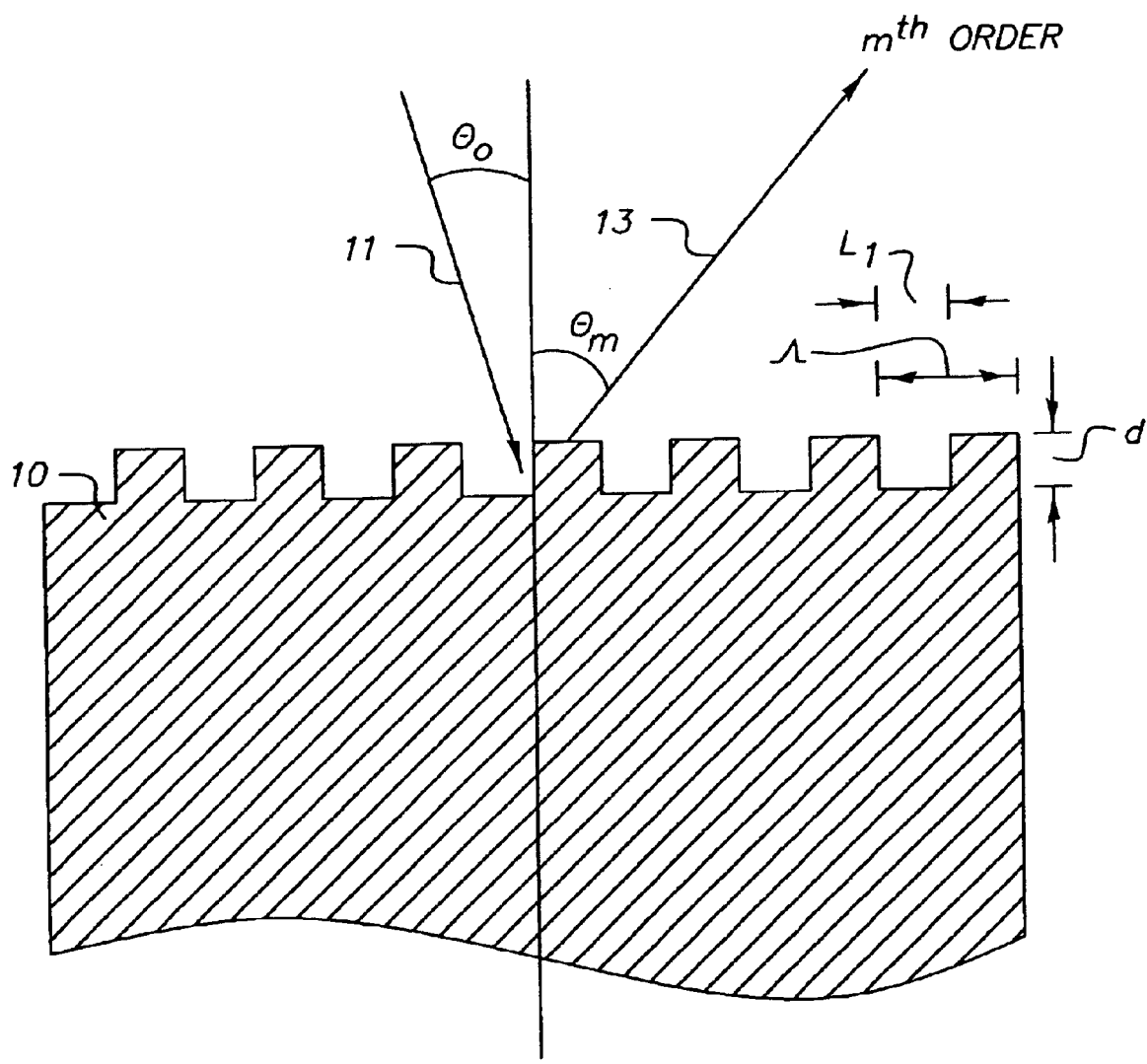
FIG. 1 is a prior art illustration of diffraction from a reflective grating.

FIG. 1 illustrates a prior art reflective grating 10 having an optical beam 11 incident on the grating 10 at an angle $\theta_0$. The grating surface is defined to have a period $\Lambda$, which defines the diffraction angles according to Equation 1. A diffracted beam 13 corresponding to diffraction order m exits the grating 10 at an angle $\theta_m$.

The diffraction grating 10 pictured in FIG. 1 is a binary grating, where the grating profile is a square wave. The duty cycle is defined as the ratio of the width of the groove $L_1$ to the grating period $\Lambda$. A binary phase grating will have the maximum diffraction efficiency when the duty cycle is equal to 0.5 and R, the reflectivity of the material used to form the grating 10 is equal to 1.0.

For uniform reflectivity and 0.5 duty cycle, Equation 2 gives the theoretical diffraction efficiency, within the accuracy of scalar diffraction theory.

$$\eta_m = R\cos^2\left(\frac{\pi}{\lambda}(q_m d - m\lambda/2)\right)\frac{\sin^2(m\pi/2)}{(m\pi/2)^2}, \qquad \text{Equation (2)}$$

where $q_m$ is a geometrical factor, $$q_m = \cos\theta_0 + \cos\theta_m \qquad \text{Equation (3)}$$

$$= 1 + \sqrt{1 - (m\lambda/\Lambda)^2} \text{ for normal incidence}(\theta_0 = 0).$$

For normally incident illumination, the maximum efficiency in the first (m=1) order occurs when the optical grating depth d is equal to $\lambda/4$. Such a grating has equal diffraction efficiencies into the +1 and −1 orders of up to 40% for the gratings of interest ($\lambda/\Lambda \leq 0.5$), while the remaining light is diffracted into higher odd orders (i.e. ±3, ±5, etc.).

There are two likely methods by which an electro-mechanical grating device, such as the grating light valve, would modulate an optical beam to produce a desired modulated optical beam. The first modulation method is pulse width modulation (PWM), in which the ribbons are actuated between on and off states for a varied amount of time to produce pulses of light with equal intensity. In this method, the diffraction efficiency of the actuated grating should be maximized for optimal performance.

The second modulation method, which is the subject of this invention, is termed intensity modulation (IM), for which one would continuously vary the diffraction efficiency of the electro-mechanical grating, while keeping the pulse width fixed. This method allows the actuated ribbon heights to be continuously controlled between a point of little or no diffracted intensity (preferably corresponding to no electrostatic force) and a point of maximum diffracted intensity (corresponding to an actuation distance of $\lambda/4$ for the movable ribbons). The concept of a GLV with a variable diffraction efficiency has been discussed in the patent literature by Bloom et al. '360.

Figure 2:
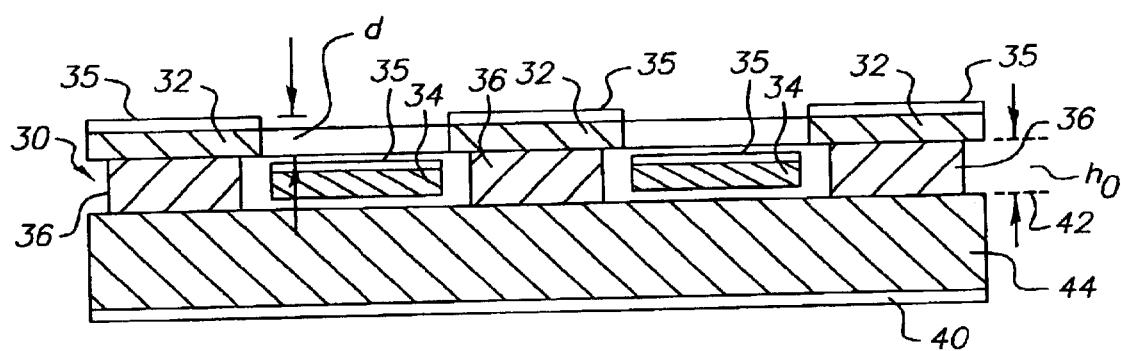
FIG. 2 is a prior art illustration of the electro-mechanical grating by Bloom et al. for continuous level control.

FIG. 2 is a prior art drawing of the electro-mechanical grating device 30 described by Bloom et al. for continuous level control. A plurality of movable ribbon elements 34 and stationary ribbon elements 32 are arrayed in an interdigitated fashion over a substrate 44. A conductive, reflective layer 35 is provided above both the movable ribbon elements 34 and stationary ribbon elements 32. The movable ribbon elements 34 can be actuated to any depth, d, by applying a voltage between the conductive, reflective layer 35 and a ground electrode 40 which is provided below the substrate 44. The stationary ribbon elements 32 are fixed by solid supports 36. Therefore, when the movable ribbon elements 34 are actuated, a diffraction grating with variable diffraction efficiency is formed.

The substrate 44 between the solid supports 36 and the bottom electrode 40 is not specified, but is assumed to be a semiconductor to be consistent with all other embodiments of the invention disclosed in Bloom et al '360. In accordance with microelectronics industry standards, a low-resistivity silicon wafer would most likely be used as the substrate 44, and there would be an insignificant potential drop between the bottom electrode 40 and the upper substrate surface 42.

When a voltage V is applied to the movable ribbon elements 34 with respect to the ground electrode 40 of the electro-mechanical grating device 30 illustrated in FIG. 2, an electrostatic force is produced that reduces the height of the center of the movable ribbon elements 34 from its unactuated height $h_0$ by a deflected amount d. The strength of the electrostatic force per unit area applied to the center of the ribbon is approximately given by $$F_{es} = \frac{\varepsilon_0 V^2}{2(h_0 - d + t_r/\varepsilon_r)^2}, \quad \text{Equation (4)}$$

where $t_r$ and $\epsilon_r$ are the thickness and the relative dielectric constant, respectively, of the ribbon layer.

Opposing the electrostatic force is the tensile force resulting from the increased length of the ribbons. This force is directed along the length of the ribbon, which, when deflected, has a vertical component that opposes the electrostatic force. The vertical component of the tensile force per unit area can be modeled as a spring force $$F_s = -kd. \quad \text{Equation (5)}$$

In Equation 5, k is the spring constant, which is affected by the intrinsic stress and elastic modulus of the ribbon material and the geometry of the movable ribbon elements 34.

For each small applied voltage, there exists a deflected amount d for which the ribbon is in equilibrium, i.e. the electrostatic force and the spring force nullify each other. However, as the applied voltage is increased, a voltage can be reached at which the spring force is insufficient to maintain equilibrium, and the electrostatic force causes the ribbon to accelerate downward until the ribbon makes contact with a mechanical barrier, typically the substrate. This phenomenon is referred to as "pull-down," and the voltage at which this occurs is referred to as the pull-down voltage, $V_{PD}$.

The pull-down voltage can be deduced by observing that the spring force is a linear function of the ribbon deflection, while the electrostatic force behaves as $(h_0-d)^{-2}$. Thus, the pull-down voltage is equivalent to the point at which the curve of $-F_s$ versus d is tangent to the curve of $F_{es}$ versus d. In mathematical terms, the requirements for the pull-down condition are $$F_{es}(V,d) = -F_s(d)$$

$$\left.\frac{\partial F_{es}(V,d)}{\partial (d)}\right|_{V=V_{PD}, d=d_{max}} = -\left.\frac{\partial F_s(d)}{\partial (d)}\right|_{d=d_{max}} \quad \text{Equation (7)}$$

Equation 6 states that equilibrium is maintained (defining the pull-down condition as the largest voltage at which equilibrium exists). This equation holds for all $V \leq V_{PD}$. Equation 7 states that the two curves are tangent. In Equation 7, $d_{max}$ is designated as the ribbon deflection at which pull-down occurs.

Solving Equations 6 and 7 yields approximate expressions for the pull-down voltage and the corresponding ribbon deflection, $$V_{PD} = \sqrt{\frac{8k}{27\varepsilon_0 wL}\left(h_0 + \frac{t_r}{\varepsilon_r}\right)^{3/2}}, \quad \text{Equation (8)}$$

$$d_{max} = \frac{1}{3}\left(h_0 + \frac{t_r}{\varepsilon_r}\right) \quad \text{Equation (9)}$$

Thus, the maximum distance that the ribbons can be continuously actuated before pull-down occurs is approximately one third of the unactuated height.

The air gap above the substrate must have a thickness of at least ¾ of the wavelength of light to ensure continuous control of the efficiency of diffraction from zero to maximum. However, if the ribbons are pulled down to the substrate, the strain incurred in the ribbon material by actuating this distance can exceed the yield strain and result in ribbon breakage.

In principle, the ribbons can be prevented from actuating to pull-down by limiting the voltage to a lower value than the pull-down voltage, $V_{PD}$. However, accidental electrical transients can result in unintentional actuation past pull-down. Furthermore, due to various other factors (e.g. the injection of charge into the dielectric ribbon material or if there were relaxation of the intrinsic stress of the ribbon film because of aging) the voltage required to achieve a desired deflected amount, d, is a quantity that can vary over time. Similarly, the pull-down voltage can vary with time. Thus, the device requires frequent monitoring of the voltage in order to prevent the pull-down voltage from drifting outside the range of voltages used for actuation.

Alternatively, the device can be engineered with a channel depth much greater than is required for actuation into the full dynamic range of diffraction efficiencies. However, increasing the channel depth has the undesired effect of increasing the voltage required for actuation.

This invention describes a device that has a built-in mechanism for preventing mechanical failure due to accidental pull-down that is not affected by charging and that does not increase the voltage required for actuation.

Figure 3:
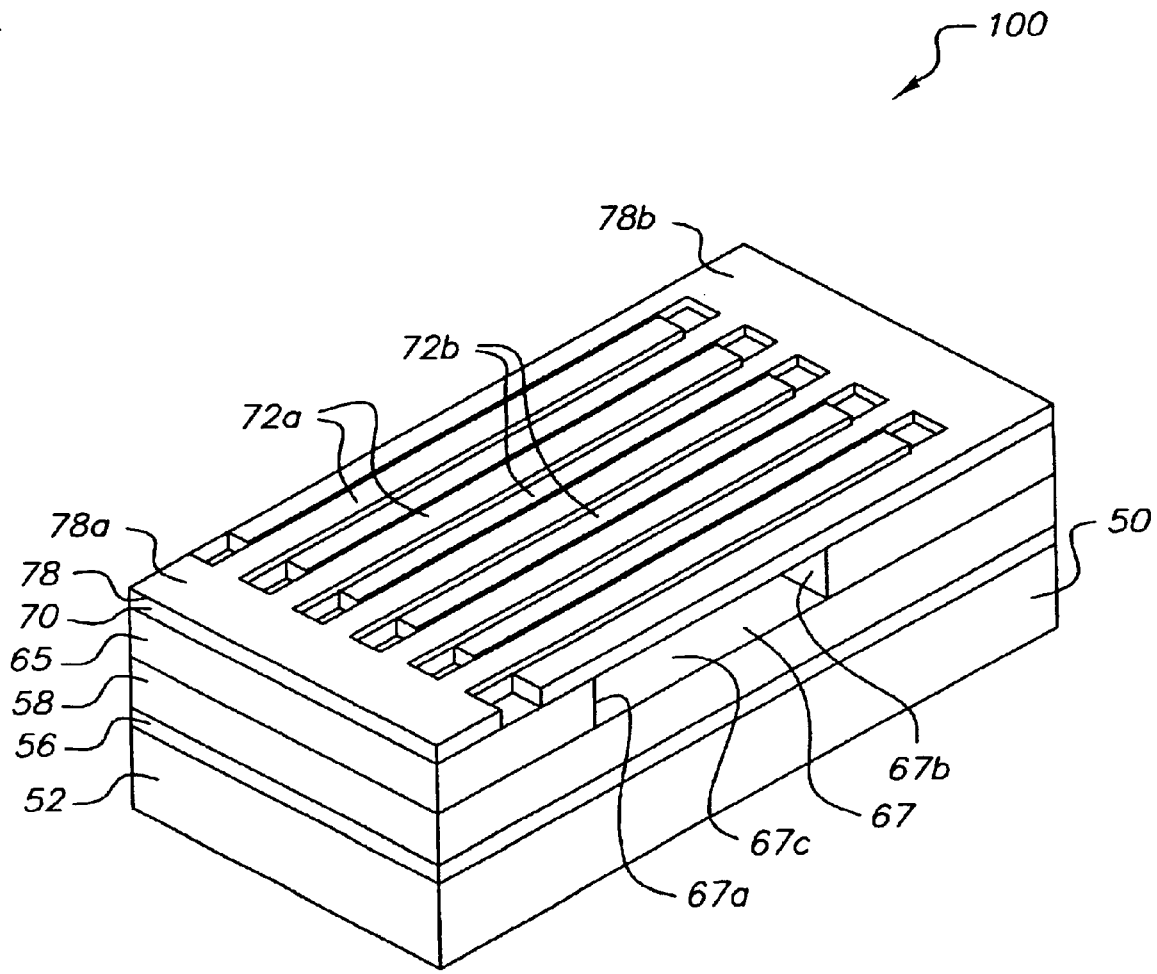
FIG. 3 is a prior art illustration of the electro-mechanical grating device of the present invention.

FIG. 3 is a prior art perspective view of an electro-mechanical grating device 100 used to describe a prior art invention. The mechanically deformable structures of the electro-mechanical grating device 100 are formed on top of a base 50. One embodiment, as shown in FIG. 3, comprises an electro-mechanical grating device 100 that can be operated by the application of an electrostatic force. The base 50 comprises a substrate 52. The material of the substrate 52 is chosen from the materials glass, plastic, metal, and semiconductor material. The substrate 52 is covered by a thin bottom conductive layer 56. In this embodiment the thin bottom conductive layer 56 is necessary since it acts as an electrode for applying the voltage to actuate the mechanical grating device 100. The thin bottom conductive layer 56 is selected from the group consisting of aluminum, titanium, gold, silver, tungsten, silicon or silicon alloys, and indium tin oxide. The thin bottom conductive layer 56 is covered by a dielectric mechanical stop layer 58. Above the dielectric mechanical stop layer 58 a spacer layer 65 is provided. On top of the spacer layer 65, a ribbon layer 70 is formed, which is covered by a reflective layer 78. In this embodiment the reflective layer 78 has to also be conductive in order to provide a second electrode for the actuation of the mechanical grating device 100. Furthermore, the electrodes are patterned from the reflective and conductive layer 78.

The spacer layer 65 has a longitudinal channel 67 formed therein. The longitudinal channel 67 comprises a first and a second side wall 67a and 67b, respectively, and a bottom 67c. The channel 67 is open to the top and covered by a first and a second set of deformable ribbon elements 72a and 72b, respectively. Each deformable ribbon element 72a and 72b spans the channel 67 and is secured to the surface of the spacer layer 65 on either side of the channel 67. As mentioned above, the ribbon layer 70 is covered by the reflective and conductive layer 78. The reflective and conductive layer 78 is patterned such that there is a first and a second conductive region 78a and 78b, respectively. Both the first and the second conductive region 78a and 78b respectively, have, according to the patterning, a comb-like structure and are arranged at the surface of the electro-mechanical grating device 100 in an interdigitated manner. The first and second conductive region 78a and 78b are mechanically and electrically isolated from one another. According to the pattern of the reflective and conductive layer 78 the ribbon layer 70 is patterned in the same manner. As a result there are the first and the second set of deformable ribbon elements 72a and 72b spanning the channel 67 and in the direction of the channel 67 are arranged such that every other deformable ribbon element belongs to one set.

Figure 4:
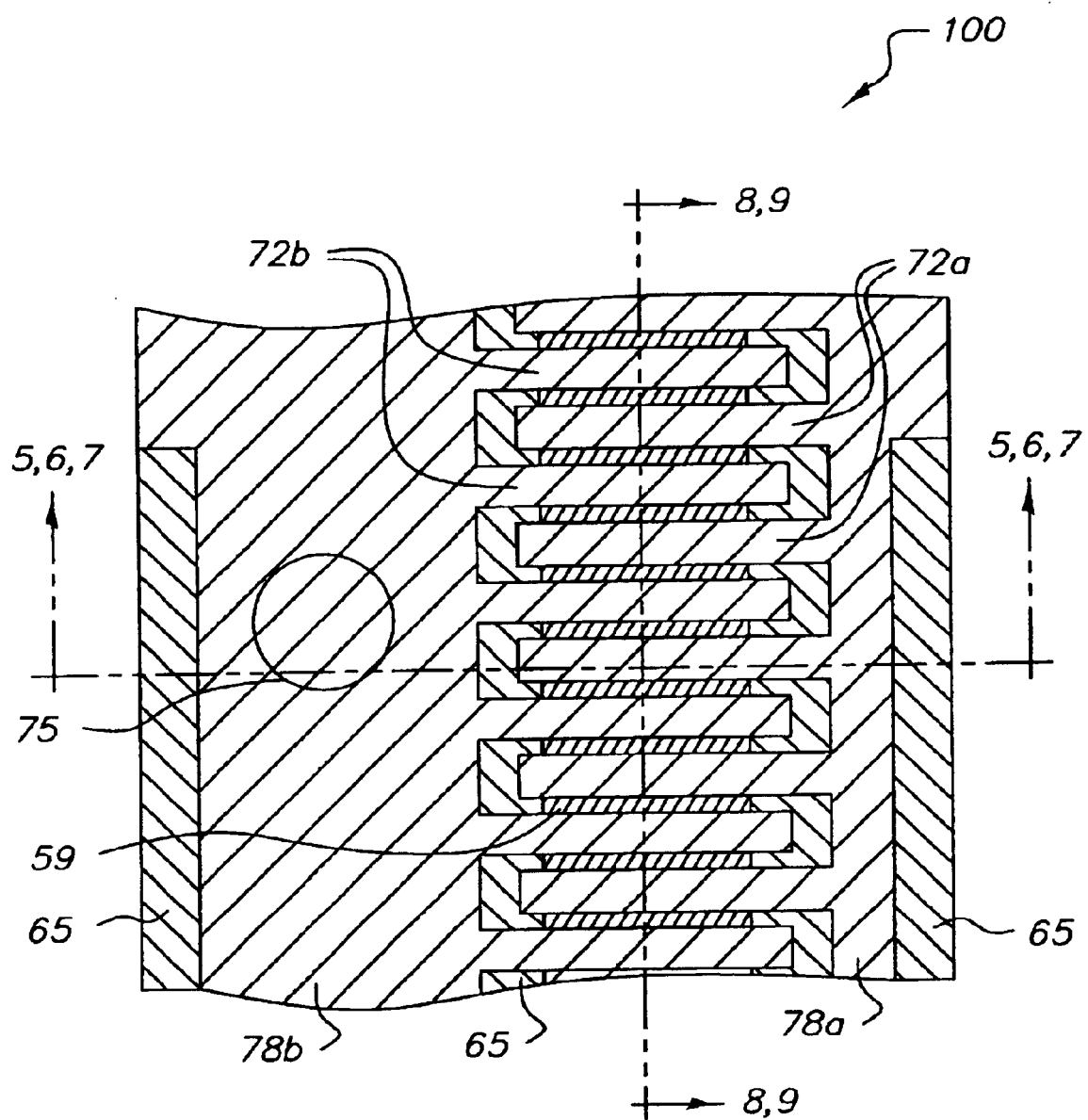
FIG. 4 is a top view of the electro-mechanical grating device of the present invention.
Figure 5:
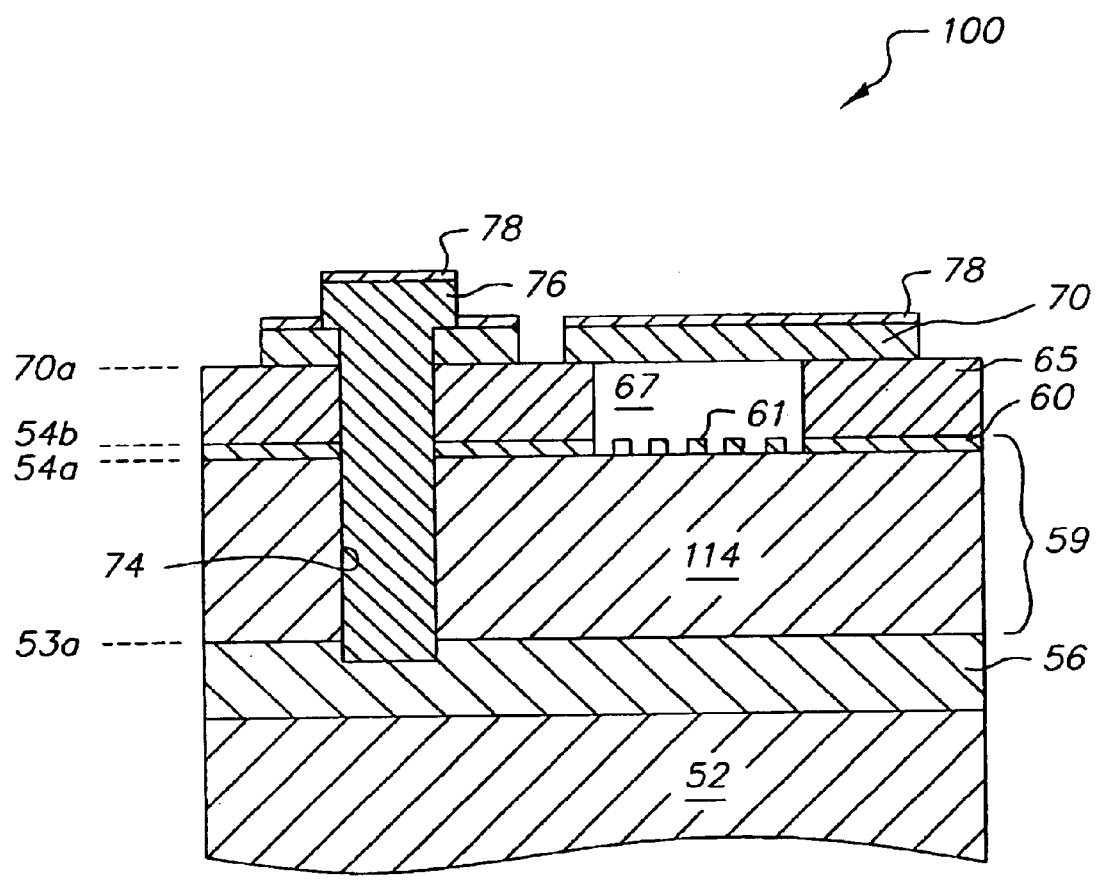
FIG. 5 is a cross-sectional view along plane 5,6,7—5,6,7 indicated in FIG. 4 to illustrate the layered structure of one embodiment of the invention.
Figure 6:
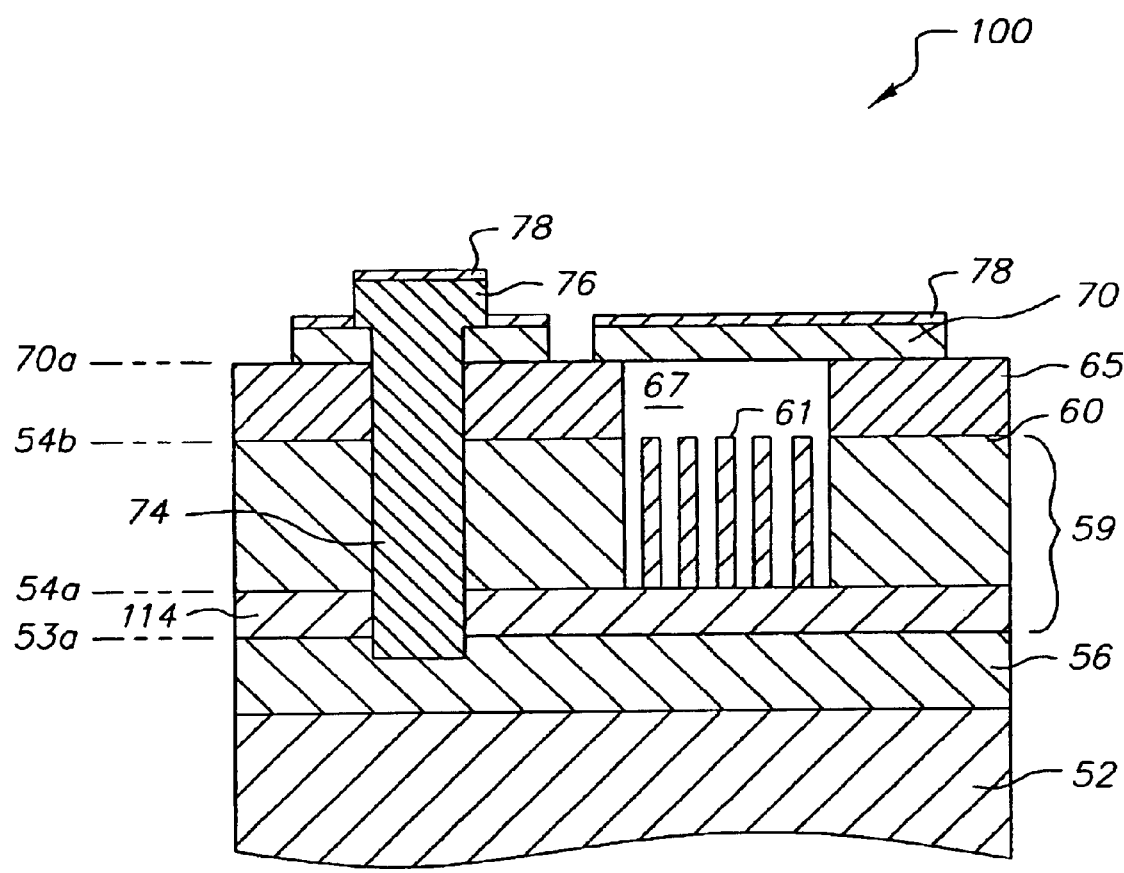
FIG. 6 is a cross-sectional view along plane 5,6,7—5,6,7 indicated in FIG. 4 to illustrate the layered structure of a second embodiment of the invention.
Figure 7:
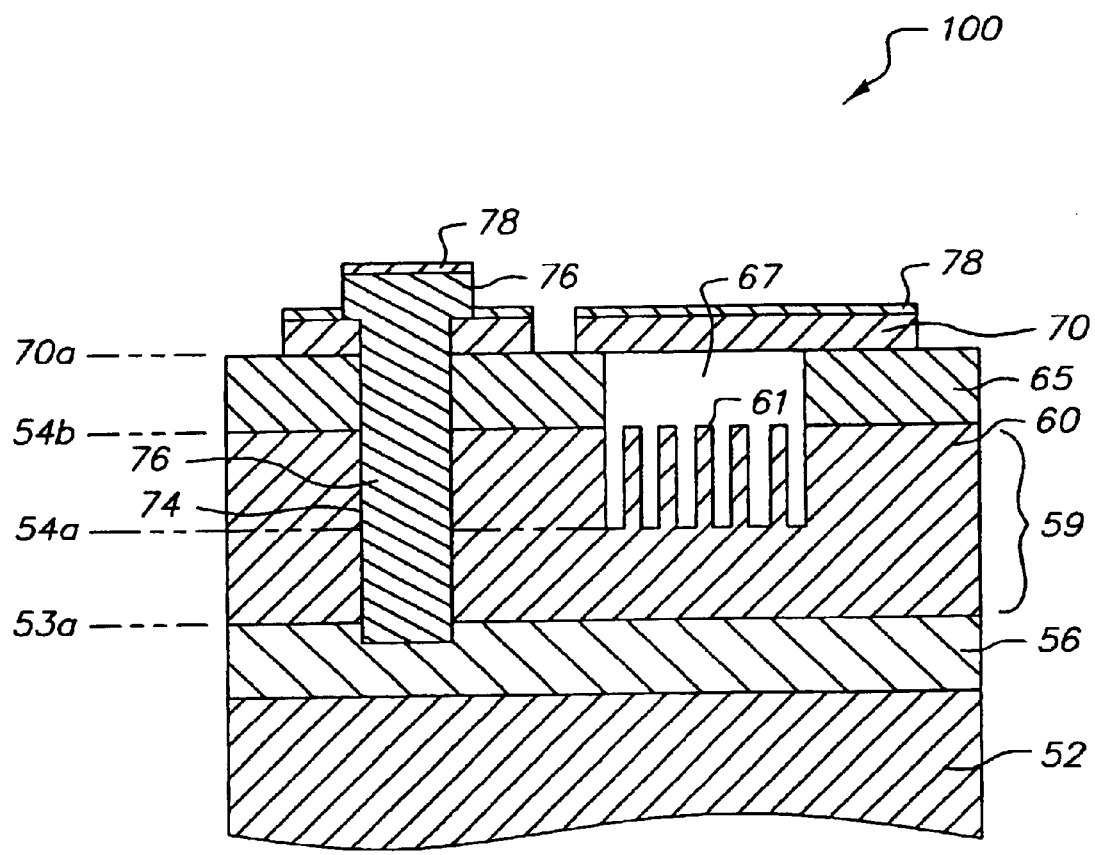
FIG. 7 is a cross-sectional view along plane 5,6,7—5,6,7 indicated in FIG. 4 to illustrate the layered structure of a third embodiment of the invention.
Figure 8:
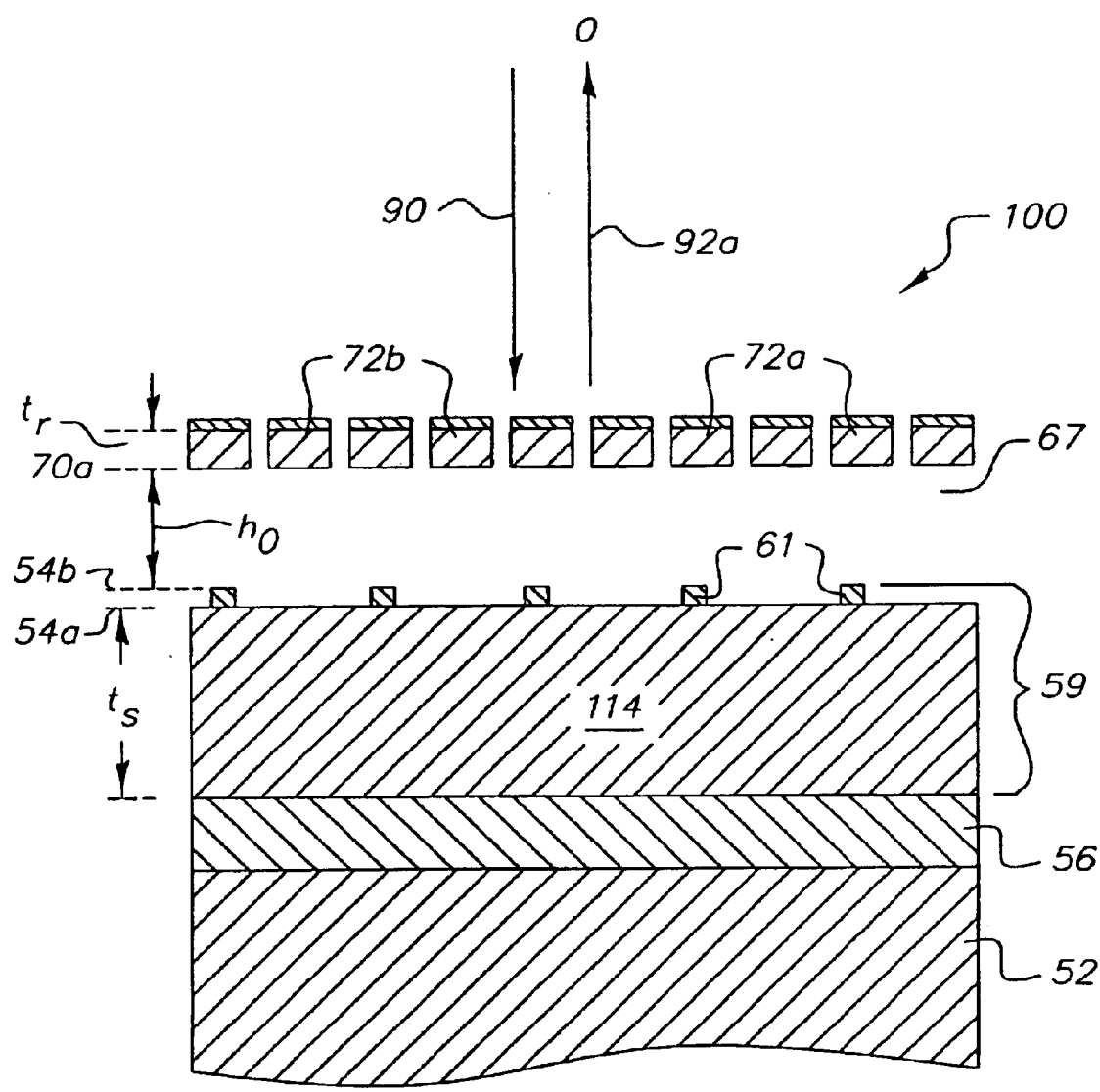
FIG. 8 is a cross-sectional view along plane 8,9—8,9 indicated in FIG. 4 of the electro-mechanical grating device wherein no force is applied to the deformable ribbons.
Figure 9:
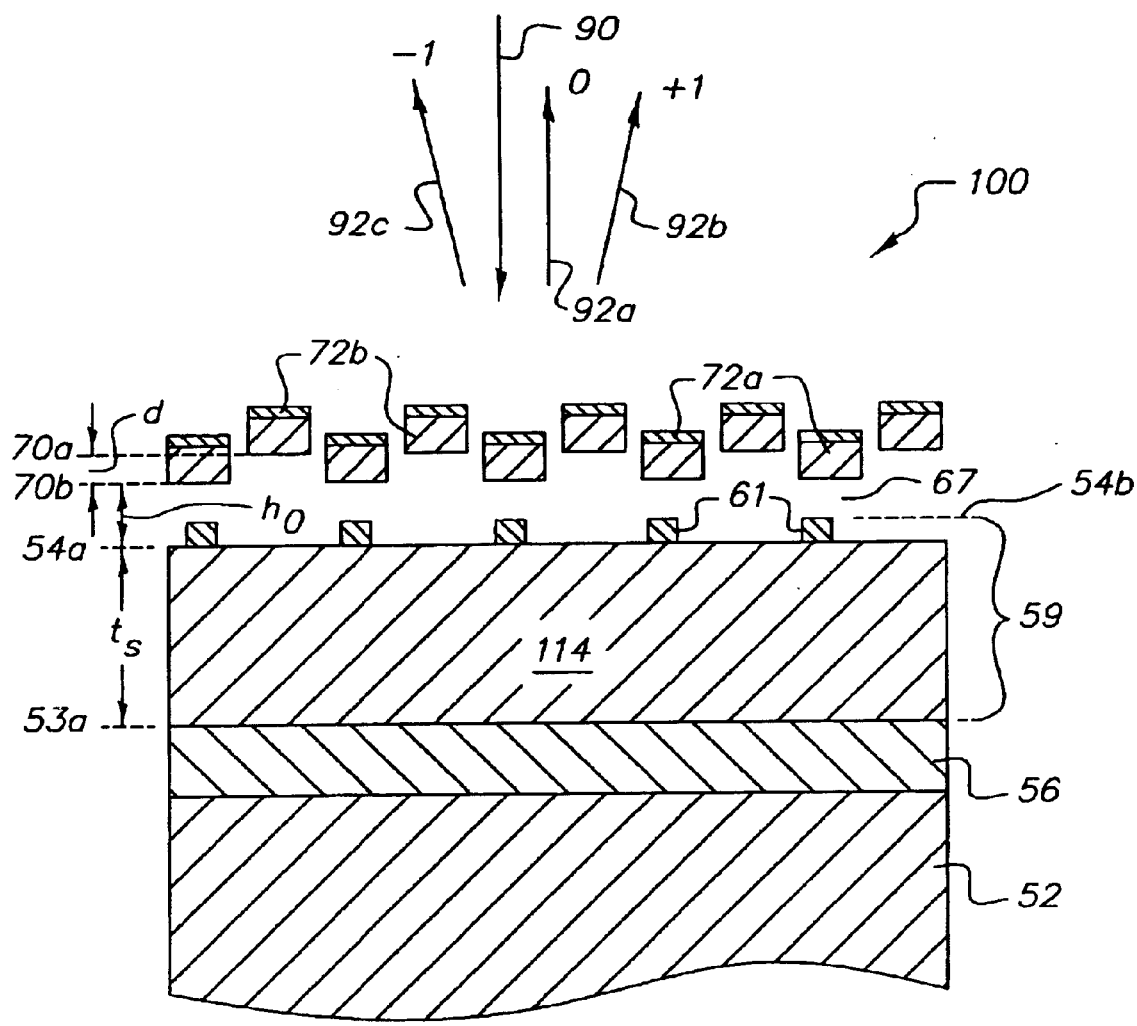
FIG. 9 is a cross-sectional view along plane 8,9—8,9 indicated in FIG. 4 of the electro-mechanical grating device wherein force is applied to the deformable ribbons.

FIG. 4 is a top view of the present invention. A first view plane 5,6,7—5,6,7 perpendicular to the length of the electro-mechanical grating device 100, provides a cross-sectional view of the electro-mechanical grating device 100 as shown in FIGS. 5–7. A second view plane 8,9—8,9, parallel to the length of the electro-mechanical grating device 100, provides a cross-sectional view of the operation of the device as shown in FIGS. 8 and 9.

The electro-mechanical grating device 100 as shown in FIG. 4 is a device that can be actuated by the application of an electrostatic force. The first and the second electrically conductive regions 78a and 78b, respectively, are isolated from each other to allow the application of voltage to either the first or the second set of deformable ribbon elements 72a and 72b, respectively. The first electrically conductive region 78a applies the voltage to the first set of deformable ribbon elements 72a, and the second electrically conductive region 78b provides the voltage to the second set of deformable ribbon elements 72b. The second electrically conductive region 78b is in electrical contact with the thin bottom conductive layer 56 designated at the base 50 (shown clearly in FIG. 3) through the contact 75. As shown in FIG. 4, portions of a spacer layer 65 and a mechanical stop 59, consisting of at least one dielectric layer, are visible, because of the patterning of the first and second conductive regions 78a and 78b. For operation of the electro-mechanical grating device 100, the electrostatic force is produced by a voltage difference between the thin bottom conductive layer 56 and the first conductive region 78a, which is formed atop each deformable ribbon element 72a. It's easily understood that a conductive region can also be formed on the bottom surface 70b (shown clearly in FIG. 9) of each deformable ribbon element 72a or 72b. Additionally, the conductive region can be located within each deformable ribbon element 72a and 72b.

FIG. 5 is a cross-sectional view along plane 5,6,7—5,6,7 as indicated in FIG. 4, to illustrate the film structure that comprises the device. In the illustrated embodiment, the thin bottom conductive layer 56 defines a surface 53a. Atop the bottom conductive layer 56, is a mechanical stop 59 that is different and distinct from the dielectric mechanical stop layer 58 shown in prior art FIG. 3. For this embodiment, the mechanical stop 59 is comprised of a protective layer 114, which defines an upper surface 54a, and a standoff layer 60, that is located on top of the protective layer 114. A series of standoffs 61 that reside atop the protective layer 114 can be formed as pedestals or lines within the channel 67 by patterning the standoff layer 60. The standoffs 61 reduce the contact area (and thereby the probability of stiction) in the case of full actuation of the deformable ribbon elements 72a and 72b of FIG. 4. The top surface of the standoffs 61 defines a stopping surface 54b for the deformable ribbon elements 72a and 72b upon full actuation.

Still referring to FIGS. 4 and 5, above the standoff layer 60, the spacer layer 65 defines a lower ribbon surface 70a. The reflective and conductive layer 78, which is formed atop the ribbon layer 70, defines the deformable ribbon elements 72a and 72b. Contact between the second conductive region 78b and the bottom conductive layer 56 is accomplished by etching at least one opening 74 through the multilayered device that comprises the protective layer 114, the spacer layer 65, and the ribbon layer 70. The opening 74 is filled by a thick conductive layer 76 that is, for example, an aluminum alloy. The thick conductive layer 76 is limited by photolithographic processing and etching methods to a small area coated by the thick conductive layer 76.

In the event that the voltage applied to actuate ribbon elements 72a, 72b exceeds that required for pull-down, the presence of the mechanical stop 59, including the protective layer 114 and the standoffs 61 that form the stopping surface 54b, prevents the ribbon elements 72a, 72b from deflecting a large distance. As shown in FIG. 5, the standoffs 61 may be substantially less than the thickness of the protective layer 114. In fact, for a case when the standoff layer 60 is thin enough to have insignificant structural integrity as compared to the protective layer 114, the mechanical stop 59 is effectively comprised primarily of the protective layer 114, as shown below in the simplified pull-down mathematical model.

Herein, the thickness of the spacer layer 65 and the thickness of the protective layer 114 are chosen such that the separation of surfaces 70a and 54b is slightly less than the maximum deflection for pull-down, $d_{max}$, so that pull-down cannot occur. Defining the separation of surfaces 70a and 54b as $h_0$, the separation of surfaces 54a and 53a as $t_{ms}$; and the dielectric constants of the ribbon layer 70 and the protective layer 114 as $\epsilon_r$ and $\epsilon_{ms}$, respectively, then the maximum deflection for pull-down is given by $$d_{max} = \frac{1}{3}\left(h_0 + \frac{t_r}{\epsilon_r} + \frac{t_{ms}}{\epsilon_{ms}}\right) \qquad \text{Equation (10)}$$

For the ideal structure, $h_0$ is slightly greater than ¼ of a wavelength of light to allow a deflection of ¼ without contact with a mechanical barrier. Therefore, the thickness of the protective layer 114, $t_{ms}$, required to prevent pull-down within the channel 67 is, $$t_{ms} \geq \epsilon_{ms}\frac{\lambda}{2} - \frac{\epsilon_{ms}}{\epsilon_r}t_r \qquad \text{Equation (11)}$$

As an example, thermally grown silicon dioxide can be used for the protective layer 114. The dielectric constant of silicon dioxide is approximately 4.0. Thus, the thickness of the protective layer 114, essentially the entire mechanical stop 59, should be approximately twice the wavelength of light, or approximately 10,000 Angstroms for visible wavelengths.

The preferred embodiment of the device is illustrated in FIG. 6, in which a cross-section along plane 5,6,7—5,6,7 of FIG. 4 is shown. In this embodiment and in contrast to FIG. 5, the mechanical stop 59 includes a series of tall standoffs 61 fabricated within the channel 67 to a height necessary to provide a rigid barrier at stopping surface 54b before pull-down occurs. A protective layer 114 is shown in FIG. 6 between the thin bottom conductive layer 56 and the standoff layer 60. The electro-mechanical behavior of this embodiment is much more complicated, being dictated by the height, area, locations, and dielectric properties of the standoffs 61. Thus, for any standoff geometry, there is an ideal thickness of the standoff layer 60, denoted $t_{so}$, which defines the stopping surface 54b located at the distance below the lower ribbon surface 70a at which the actuated ribbons would experience pull-down.

A third embodiment is illustrated in FIG. 7, in which a cross-section along plane 5,6,7—5,6,7 of FIG. 4 is shown. The third embodiment is similar to the second embodiment, and shows the mechanical stop 59 with standoffs 61 that are fabricated within the standoff layer 60 to form a rigid barrier at stopping surface 54b. The dielectric material forming the standoff layer 60 is provided directly atop the bottom conductive layer 56 and defines the stop surface 54b. The standoff layer 60 is patterned in the form of standoffs 61 within the area of the channel 67, and the regions exposed by the patterning are etched to a depth less than the thickness of the standoff layer 60. The depth of the etch and the thickness of the standoff layer 60 are chosen to produce standoffs with height $t_{so}$. The standoff height $t_{so}$ is chosen such that deformable ribbon elements 72a, 72b would experience pull-down when supplied a voltage that would deflect the ribbon elements 72a, 72b a distance equal to the separation of lower ribbon surface 70a and stopping surface 54b.

For operation of the device 100, the electrostatic force is produced by a voltage difference between the thin bottom conductive layer 56 and the reflective and conductive layer 78. FIG. 8 illustrates a cross-section of the device along view plane 8,9—8,9 of FIG. 4 with no actuation, for which the ribbon elements 72a, 72b form a planar, reflective surface. The faces of the ribbon elements 72a and 72b that oppose the substrate 52 are located at the lower ribbon surface 70a. Moreover, in an unactuated state the device 100 receives incident light 90 and reflects light 92a. The lower ribbon surface 70a is separated from the stopping surface 54b by the distance $h_0$.

FIG. 9 is a cross-section of the device along view plane 8,9—8,9 with an electrostatic force applied to ribbon elements 72a. The force results in a deflection toward the substrate of the centers of ribbon elements 72a, while the ribbon elements 72b remain unmoved, thus forming a diffraction grating. In the actuated state, the incident light beam 90 is primarily diffracted into the $+1^{st}$ order 92b and $-1^{st}$ order 92c, and some remaining reflected light 92a. The faces of the actuated ribbon elements 72a that oppose the substrate 52 define a deflected bottom surface 70b. The separation between the lower ribbon surface 70a and the actuated bottom surface 70b is equal to the deflection distance d. For any deflection distance d in the range of zero and $\lambda/4$, there exists a voltage that will result in the ribbon elements 72a being actuated by that deflection distance. There is a voltage, greater than the voltage resulting in ¼ deflection, which would satisfy the conditions for pull-down presented in equations 10 and 11. However, the actual deflection distance of the ribbon elements 72a would be limited to $h_0$ due to the presence of the rigid barrier at stopping surface 54b, thus reducing the possibility of mechanical failure.

Figure 10:
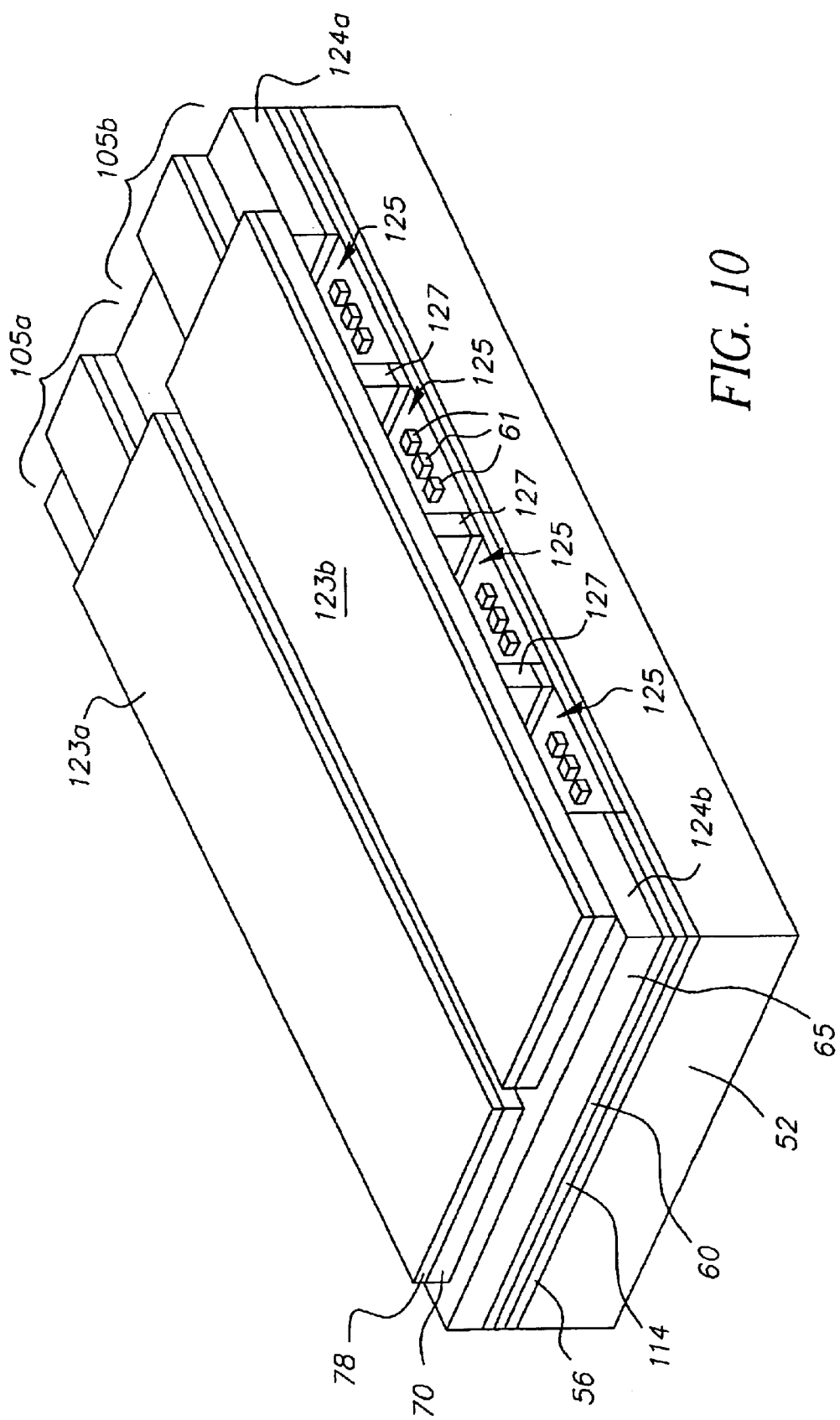
FIG. 10 is a perspective, partially cut-away view of the spatial light modulator with conformal grating devices of the present invention, showing two devices in a linear array.

Conformal grating devices of the preferred embodiment of the present invention are illustrated in FIGS. 10–13b. FIG. 10 shows the structure of two side-by-side conformal grating devices 105a and 105b in an unactuated state. In this embodiment, the grating devices 105a, 105b can be operated by the application of an electrostatic force. The grating devices 105a and 105b are formed on top of a substrate 52, made of glass, metal, plastic, or semiconductor materials, that is covered by a thin bottom conductive layer 56 which acts as an electrode to actuate the grating devices 105a, 105b. The thin bottom conductive layer 56 can be made of materials such as aluminum, titanium, gold, silver, tungsten, doped silicon, or indium tin oxide. The thin bottom conductive layer 56 is covered by a protective layer 114 followed by a standoff layer 60, and a spacer layer 65. On top of the spacer layer 65, a ribbon layer 70 is formed which is covered by a reflective layer 78. In the present embodiment, the reflective layer 78 is also a conductor in order to provide electrodes for the actuation of the conformal grating devices 105a and 105b. The reflective and conductive layer 78 is patterned to provide electrodes to the two conformal grating devices 105a and 105b. The ribbon layer 70 preferably comprises a material with a sufficient tensile stress to provide a large restoring force. Examples of ribbon materials are silicon nitride, titanium aluminide, and titanium oxide. The thickness and tensile stress of the ribbon layer 70 are chosen to optimize performance by influencing the electrostatic force for actuation and the restoring force. These forces affect the voltage requirement, speed, and resonance frequency of the conformal grating devices 105a and 105b.

Each of the two grating devices 105a and 105b has an associated elongated ribbon element 123a and 123b patterned from the reflective and conductive layer 78 and the ribbon layer 70. The elongated ribbon elements 123a and 123b are supported by end supports 124a and 124b formed from the spacer layer 65 and by one or more intermediate supports 127. In FIG. 10, three intermediate supports 127 are shown formed from the spacer layer 65. These intermediate supports 127 are uniformly separated in order to form four equal-width channels 125. The elongated ribbon elements 123a and 123b are secured to the end supports 124a, 124b respectively, and to the intermediate supports 127. The end supports 124a and 124b are not defined other than at their edges facing the channel 125. A plurality of square standoffs 61 are patterned at the bottom of the channels 125 from the standoff layer 60. These standoffs 61 reduce the possibility of the ribbon elements 123a, 123b sticking when actuated. The standoffs 61 may also be patterned in shapes other than square; for example, rectangular or round.

Figure 11:
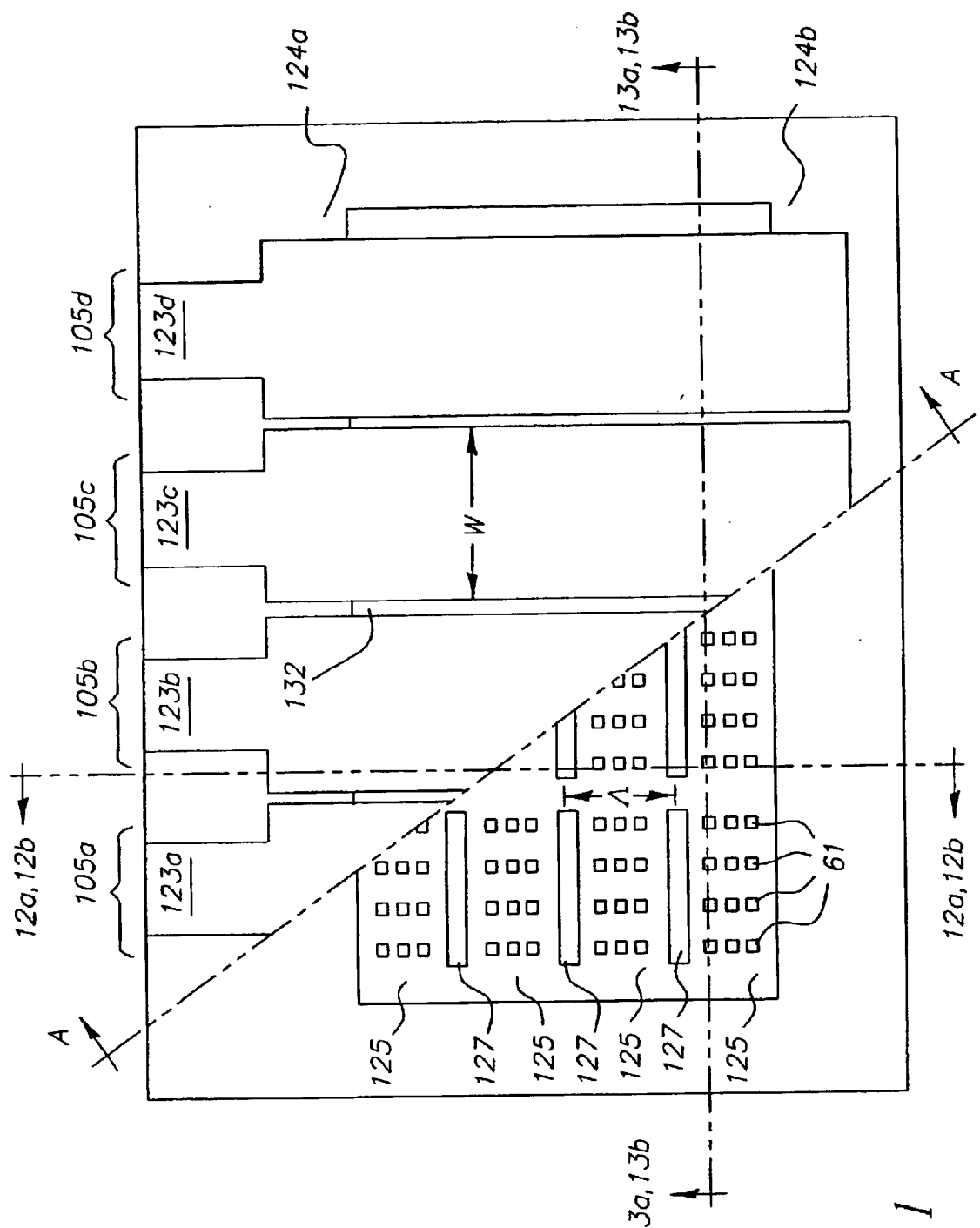
FIG. 11 is a top view of the spatial light modulator of the present invention, showing four devices in a linear array.

A top view of a four-device linear array of conformal grating devices 105a, 105b, 105c and 105d is shown in FIG. 11. The elongated ribbon elements 123a, 123b, 123c, and 123d respectively, are depicted partially removed over the portion of the diagram below the line A—A in order to show the underlying structure. For best optical performance and maximum contrast, the intermediate supports 127 must be completely hidden below the elongated ribbon elements 123a, 123b, 123c, and 123d. Therefore, when viewed from the top, the intermediate supports must not be visible in the gaps 132 between the conformal grating devices 105a–105d. Here each of the conformal grating devices 105a–105d has three intermediate supports 127 with four equal-width channels 125.

The center-to-center separation Λ of the intermediate supports 127 defines the period of the conformal grating devices 105a–105d in the actuated state. The elongated ribbon elements 123a–123d are mechanically and electrically isolated from one another, allowing independent operation of the four conformal grating devices 105a–105d. The thin bottom conductive layer 56 of FIG. 10 can be common to all of the devices.

FIG. 12a is a side view, through line 12a,12b–12a,12b of FIG. 11, of two channels 125 of the conformal grating device 105b in the unactuated state. FIG. 12b shows the same view of the actuated state. For operation of the device, an attractive electrostatic force is produced by applying a voltage difference between the thin bottom conductive layer 56 and the reflective and conductive layer 78 of the elongated ribbon element 123b. In the unactuated state (see FIG. 12a), with no voltage difference, the ribbon element 123b is suspended flat between the intermediate supports 127. In this state, an incident light beam 90 is primarily reflected light 92a into the mirror direction. To obtain the actuated state, a voltage is applied to the conformal grating device 105b, which deforms the elongated ribbon element 123b and produces a partially conformal grating with period Λ (FIG. 12b). FIG. 12b shows the device in the fully actuated state with the elongated ribbon element 123b in contact with the standoffs 61. The height difference between the bottom of element 123b and the top of the standoffs 61 is chosen to be approximately ¼ of the wavelength λ of the incident light. The optimum height depends on the specific shape of the actuated device. In the actuated state, the incident light beam 90 is primarily diffracted into the $+1^{st}$ order 92b and $-1^{st}$ order 92c, with additional light diffracted into the $+2^{nd}$ order 136a and $-2^{nd}$ order 136b. A small amount of light is diffracted into even higher orders and some is reflected. For light incident perpendicular to the surface of the device, the angle $\theta_m$ between the incident beam and the mth order diffracted beam is given by $$\sin \theta_m = m\lambda/\Lambda. \qquad \text{Equation 12}$$

One or more of the diffracted orders can be collected and used by the optical system, depending on the application. When the applied voltage is removed, the forces due to the tensile stress and bending restores the ribbon element 123b to its original unactuated state.

Figure 13A:
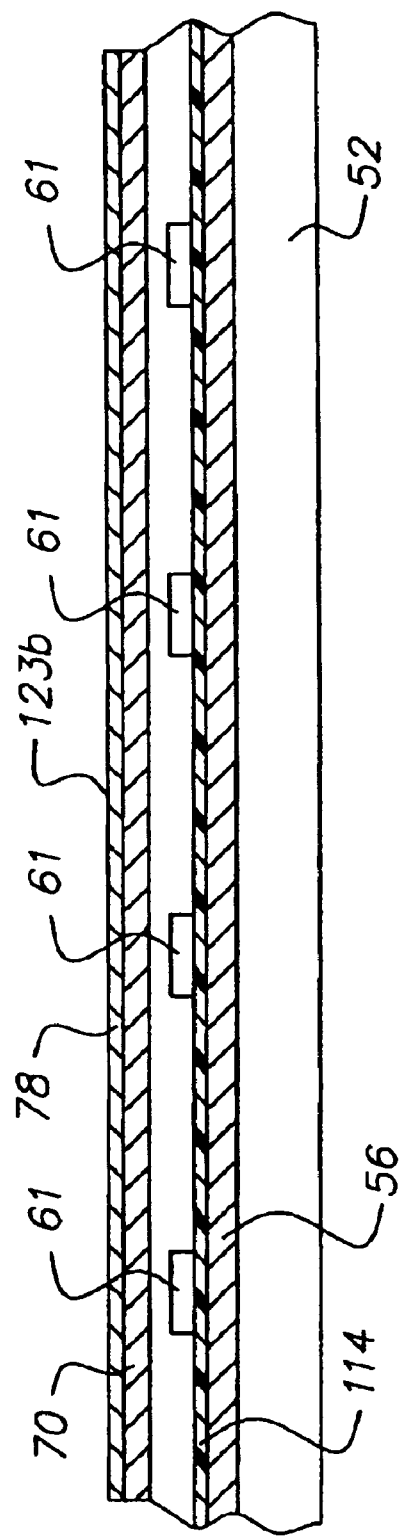
FIGS. 13a and 13b are cross-sectional views through line 13a, 13b-13a, 13b in FIG. 11 showing the device in an unactuated state and an actuated state, respectively.
Figure 13B:
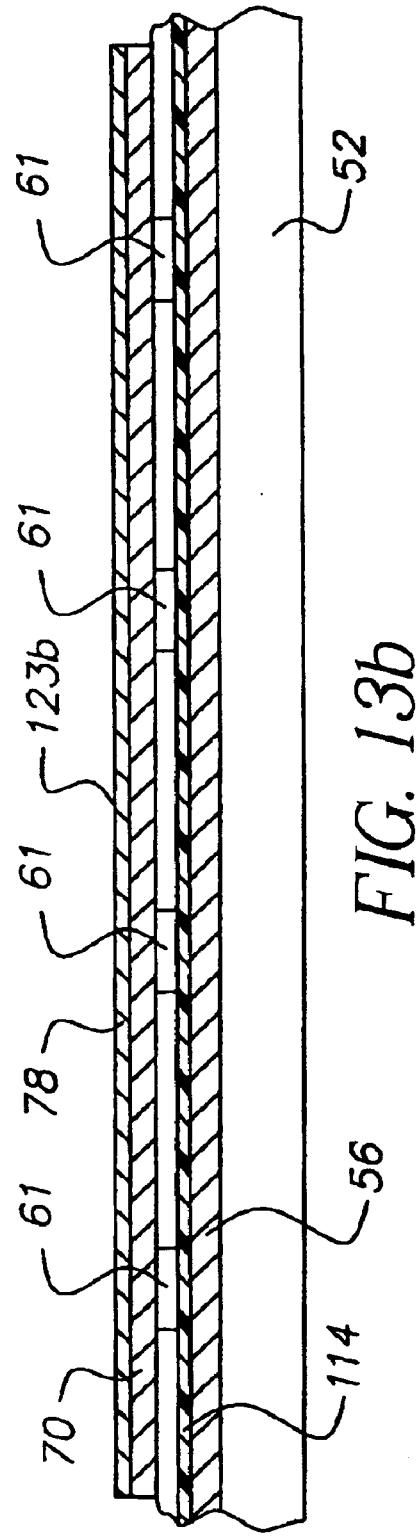

FIGS. 13a and 13b show a rotated side view through line 13a,13b-13a, 13b of FIG. 11 of the conformal grating device 105b in the unactuated and actuated states, respectively. The elongated ribbon element 123b is suspended by the end support 124b and the adjacent intermediate support 127 (not shown in this perspective). The application of a voltage actuates the device as illustrated in FIG. 13b.

In the preferred embodiment, a linear array of conformal grating devices is formed by arranging the devices as illustrated in FIGS. 10–12 with the direction of the grating period Λ (the y direction) perpendicular to the array direction (the x direction). The diffracted orders are then at various angles in the y-z plane and are perpendicular to the array direction. Even with a large linear array consisting, possibly, of several thousand devices illuminated by a narrow line of light, the diffracted orders become spatially separated over a relatively short distance. This feature simplifies the optical system design and enables feasible designs in which the separation of orders can be done spatially without the need of Schlieren optics.

The invention has been described in detail with particular reference to certain preferred embodiments thereof, but it will be understood that variations and modifications can be effected within the spirit and scope of the invention.

PARTS LIST 10 reflective grating
11 optical beam
13 diffracted beam
30 electro-mechanical grating device
32 stationary ribbon elements
34 movable ribbon elements
35 conductive, reflective layer
36 solid supports
40 ground electrode
42 upper substrate surface
44 substrate
50 base
52 substrate
53a surface
54a upper surface
54b stopping surface
56 thin bottom conductive layer
58 dielectric mechanical stop layer
59 mechanical stop
60 standoff layer
61 standoffs
65 spacer layer
67 longitudinal channel
67a first side wall
67b second side wall
67c bottom
70 ribbon layer
70a lower ribbon surface
70b bottom surface of deformable ribbon elements 72a, 72b
72a deformable ribbon element
72b deformable ribbon element
74 opening
75 contact
76 thick conductive layer
78 reflective and conductive layer
78a first conductive region
78b second conductive region
90 incident light
92a reflected light
92b +1 first order diffracted light
92c −1 first order diffracted light 100 electro-mechanical grating device
105a conformal grating device
105b conformal grating device
105c conformal grating device
105d conformal grating device
114 protective layer
123a elongated ribbon element
123b elongated ribbon element
123c elongated ribbon element
123d elongated ribbon element
124a end supports
124b end supports
125 channel
127 intermediate support
132 gaps
136a +2 second order diffracted light
136b −2 second order diffracted light

What is claimed is:

1. An electro-mechanical grating device comprising:
   a base having a surface;
   a bottom conductive layer provided above the base;
   a spacer layer is provided and a longitudinal channel is formed in the spacer layer, wherein the spacer layer defines an upper surface and the channel having a first and a second opposing side wall and a bottom;
   a plurality of spaced apart ribbon elements disposed parallel to each other and spanning the channel, the ribbon elements are fixed to the upper surface of the spacer layer on each side of the channel and each of the ribbon elements are provided with a conductive layer;
   a mechanical stop provided between the bottom conductive layer and the bottom of the channel wherein the mechanical stop forms a rigid barrier that is separated from a lower ribbon surface of the ribbon elements by a distance $h_0$, and that causes actual deflection distance of the ribbon elements to be limited to $h_0$ upon application of a pull-down voltage, thus reducing breakage of the ribbon elements, and wherein $d_{max} > h_0 > \lambda/4$, where $d_{max}$ is the ribbon deflection at which pull down occurs and $\lambda$ is a wavelength of light to be deflected by the electro-mechanical grating device.

2. The electro-mechanical grating device as recited in claim 1, wherein the mechanical stop includes:
   a protective layer; and
   a standoff layer located atop the protective layer and the standoff layer has a plurality of spaced apart patterned standoffs.

3. The electro-mechanical grating device as recited in claim 1 wherein the ribbon elements are arranged in a first and second interdigitating set; said ribbon elements of one set are mechanically and electrically isolated from the ribbon elements of the other set.

4. The electro-mechanical grating device as recited in claim 1 wherein the conductive layer, provided with each of the ribbon elements, covers the upper surface of the ribbon elements and possesses light reflecting properties.

5. An electro-mechanical grating device comprising:
   a base having a surface;
   a bottom conductive layer provided above the base;
   a spacer layer is provided and a longitudinal channel is formed in the spacer layer, the spacer layer defines an upper surface and the channel having a first and a second opposing side wall and a bottom;
   a plurality of spaced apart ribbon elements disposed parallel to each other and spanning the channel, the ribbon elements are fixed to the upper surface of the spacer layer on each side of the channel and each of the ribbon elements is provided with a conductive layer, the ribbon elements have a thickness $t_r$;
   a protective layer provided between the bottom conductive layer and the spacer layer, the protective layer has at least a thickness $t_s$ wherein $$t_s = \frac{\lambda}{2} - \frac{t_r}{\varepsilon_r},$$

where $\varepsilon_r$ is a dielectric constant of the ribbon elements, and $\lambda$ is a wavelength of light to be deflected by the electro-mechanical grating device; and
   a plurality of standoffs, patterned within the width of the channel, located atop the protective layer, and having a height equal to the thickness of the protective layer such that a mechanical stop is constructed.

6. The electro-mechanical grating device as recited in claim 5 wherein the mechanical stop provided between the bottom conductive layer and the spacer layer, the mechanical stop has at least a thickness $t_s$ wherein $$t_s \geq \varepsilon_s \frac{\lambda}{2} - \frac{\varepsilon_s}{\varepsilon_r} t_r,$$

where $\varepsilon_r$ is a dielectric constant of the ribbon elements, and $\lambda$ is a wavelength of light to be deflected by the electro-mechanical grating device, and $\varepsilon_s$ is a dielectric constant of the mechanical stop.

7. The electro-mechanical grating device as recited in claim 5 wherein the ribbon elements are arranged in a first and a second interdigitating set; said ribbon elements of one set are mechanically and electrically isolated from the ribbon elements of the other set.

8. The electro-mechanical grating device as recited in claim 5 wherein the bottom conductive layer covers the upper surface of the ribbon elements and possesses light reflecting properties.

9. An electro-mechanical grating device comprising:
   a base having a surface;
   a bottom conductive layer provided above the base;
   a spacer layer is provided and a longitudinal channel is formed in the spacer layer, the spacer layer defines an upper surface the said channel having a first and a second opposing side wall and a bottom;
   a plurality of spaced apart ribbon elements disposed parallel to each other and spanning the channel, the ribbon elements are fixed to the upper surface of the spacer layer on each side of the channel and each ribbon element is provided with a conductive layer, the ribbon elements have a thickness $t_r$; and
   a protective layer provided between the bottom conductive layer and the spacer layer, the protective layer has at least a thickness $t_s$ wherein $$t_s = \frac{\lambda}{2} - \frac{t_r}{\varepsilon_r},$$

and the protective layer has a plurality of standoffs patterned within the width of the channel such that the standoffs have a height less than the thickness of the protective layer, while residing atop the protective layer, to form a rigid barrier for the ribbon elements once they are actuated.

10. The electro-mechanical grating device as recited in claim 9 wherein the ribbon elements are arranged in a first and a second interdigitating set; said ribbon elements of one set are mechanically and electrically isolated from the ribbon elements of the other set.

11. The electro-mechanical grating device as recited in claim 9 wherein the bottom conductive layer covers the upper surface of the ribbon elements and possesses light reflecting properties.

12. A mechanical conformal grating device for modulating an incident beam of light by diffraction, comprising:
   a) a base having a surface;
   b) a bottom conductive layer provided above the base;
   c) a spacer layer is provided and a longitudinal channel is formed in the spacer layer, wherein the spacer layer defines an upper surface and the channel having a first and a second opposing side wall and a bottom;
   d) an elongated element including a light reflective surface;
   e) a pair of end supports for supporting the elongated element at both ends over the base;
   f) at least one intermediate support between the end supports;
   g) means for applying a force to the elongated element to cause the element to deform between first and second operating states, wherein the elongated element partially conforms mechanically to the intermediate support in the second operating state to form an optical grating with a diffraction grating period determined by placement of the intermediate support; and
   h) a mechanical stop provided between the bottom conductive layer and the bottom of the channel wherein the mechanical stop forms a rigid barrier having a height, $h_0$, and that causes actual deflection distance of the elongated element to be limited to $h_0$ upon application of a pull-down voltage, thus reducing breakage of the elongated element, and wherein $d_{max} > h_0 > \lambda/4$, where $d_{max}$ is the elongated element deflection at which pull down occurs and $\lambda$ is a wavelength of light to be deflected by the mechanical conformal grating device.

13. The mechanical conformal grating device as recited in claim 12, wherein the mechanical stop includes:
   a protective layer; and
   a standoff layer located atop the protective layer and the standoff layer has a plurality of spaced apart patterned standoffs.

14. The mechanical conformal grating device claimed in claim 12, wherein in the first operating state, the elongated element functions as a plane reflector and in the second operating state the elongated element functions as an optical grating with the diffraction grating period parallel to the length of the elongated element.

15. The mechanical conformal grating device claimed in claim 12, wherein the intermediate support contacts the elongated element only when in the second operating state.

16. The mechanical conformal grating device claimed in claim 12, wherein the elongated element is supported under tension.

17. A mechanical conformal grating device array for spatially modulating an incident beam of light by diffraction, comprising a plurality of mechanical conformal grating devices, each grating device comprising:
   a base having a surface;
   a bottom conductive layer provided above the base;
   a spacer layer is provided and a longitudinal channel is formed in the spacer layer, the spacer layer defines an upper surface and the channel having a first and a second opposing side wall and a bottom;
   an elongated element including a light reflective surface;
   a pair of end supports for supporting the elongated element at both ends over the base;
   at least one intermediate support between the end supports; and
   means for applying a force to the elongated element to cause the element to deform between first and second operating states, wherein the elongated element partially conforms mechanically to the intermediate support in the second operating state to form an optical grating with a diffraction grating period determined by placement of the intermediate support, the elongated element having a thickness $t_r$;
   a protective layer provided between the bottom conductive layer and the spacer layer, the protective layer has at least a thickness $t_s$ wherein $$t_s = \frac{\lambda}{2} - \frac{t_r}{\varepsilon_r},$$

where $\varepsilon_r$ is a dielectric constant of the elongated element, and $\lambda$ is a wavelength of light to be deflected by the mechanical conformal grating device; and
   a plurality of standoffs, patterned within the width of the channel, located atop the protective layer, and having a height equal to the thickness of the protective layer such that a mechanical stop is constructed.

18. The mechanical conformal grating device array claimed in claim 17, wherein in the first operating state, the elongated element functions as a plane reflector and in the second operating state the elongated element functions as optical grating with the diffraction grating period parallel to the length of the elongated element.

19. The mechanical conformal grating device array claimed in claim 17, wherein the intermediate support contacts the elongated element only when in the second operating state.

20. The mechanical conformal grating device array claimed in claim 17, wherein the elongated element is supported under tension.

21. The electro-mechanical grating device as recited in claim 17 wherein the mechanical stop provided between the bottom conductive layer and the spacer layer, the mechanical stop has at least a thickness $t_s$ wherein $$t_s \geq \varepsilon_s \frac{\lambda}{2} - \frac{\varepsilon_s}{\varepsilon_r} t_r,$$

where $\varepsilon_r$ is a dielectric constant of the elongated element, and $\lambda$ is a wavelength of light to be deflected by the mechanical conformal grating device, and $\varepsilon_s$ is a dielectric constant of the mechanical stop.

22. A mechanical conformal grating device for modulating an incident beam of light by diffraction, comprising:
   a base having a surface;
   a bottom conductive layer provided above the base;
   a spacer layer is provided and a longitudinal channel is formed in the spacer layer, the spacer layer defines an upper surface the said channel having a first and a second opposing side wall and a bottom;
   an elongated element including a light reflective surface;
   a pair of end supports for supporting the elongated element at both ends over the base;
   at least one intermediate support between the end supports; and means for applying a force to the elongated element to cause the element to deform between first and second operating states, wherein the elongated element partially conforms mechanically to the intermediate support in the second operating state to form an optical grating with a diffraction grating period determined by placement of the intermediate support, the elongated element having a thickness $t_r$;

a protective layer provided between the bottom conductive layer and the spacer layer, the protective layer has at least a thickness $t_s$ wherein $$t_s = \frac{\lambda}{2} - \frac{t_r}{\varepsilon_r},$$

and the protective layer has a plurality of standoffs patterned within the width of the channel such that the standoffs have a height less than the thickness of the protective layer, while residing atop the protective layer, to form a rigid barrier for the elongated element once it is actuated, and where $\varepsilon_r$ is a dielectric constant of the elongated element, and $\lambda$ is a wavelength of light to be deflected by the mechanical conformal grating device.

23. The mechanical conformal grating device claimed in claim 22, wherein in the first operating state, the elongated element functions as a plane reflector and in the second operating state the elongated element functions as an optical grating with the diffraction grating period parallel to the length of the elongated element.

24. The mechanical conformal grating device claimed in claim 22, wherein the intermediate support contacts the elongated element only when in the second operating state.

25. The mechanical conformal grating device claimed in claim 22, wherein the elongated element is supported under tension.

* * * * *